(12) United States Patent
Ekpenyong et al.

(10) Patent No.: US 11,245,507 B2
(45) Date of Patent: Feb. 8, 2022

(54) EFFICIENT ALLOCATION OF UPLINK HARQ-ACK RESOURCES FOR LTE ENHANCED CONTROL CHANNEL

(71) Applicant: Texas Instruments Incorporated, Dallas, TX (US)

(72) Inventors: Anthony Edet Ekpenyong, Houston, TX (US); Runhua Chen, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 907 days.

(21) Appl. No.: 14/026,878

(22) Filed: Sep. 13, 2013

(65) Prior Publication Data

US 2014/0126491 A1    May 8, 2014

Related U.S. Application Data (60) Provisional application No. 61/721,880, filed on Nov. 2, 2012, provisional application No. 61/750,157, filed
(Continued)

(51) Int. Cl.
| | | |
|---|---|---|
| *H04L 5/00* | (2006.01) | |
| *H04L 1/16* | (2006.01) | |
| *H04L 1/18* | (2006.01) | |

(52) U.S. Cl.
CPC .......... *H04L 5/0055* (2013.01); *H04L 1/1614* (2013.01); *H04L 1/1854* (2013.01); *H04L 1/1864* (2013.01)

(58) Field of Classification Search
CPC ....................... H04W 72/0406; H04L 55/0055
(Continued)

(56) References Cited

U.S. PATENT DOCUMENTS

2009/0055703 A1  2/2009  Kim et al.
2011/0096745 A1  4/2011  Ahn et al.
(Continued)

FOREIGN PATENT DOCUMENTS

| CN | 102316595 | 1/2012 |
| CN | 102573094 | 7/2012 |
| WO | WO 2010101411 | 10/2010 |

OTHER PUBLICATIONS

3GPP TSG RAN WG1 Meeting #70 bis, R1-124338, Sharp, Agenda Item: 7.5.7, San Diego, USA, Oct. 8-12, 2012, 10 pages.
(Continued)

*Primary Examiner* — Kodzovi Acolatse
*Assistant Examiner* — Abdeltif Ajid
(74) *Attorney, Agent, or Firm* — Gregory J. Albin; Charles A. Brill; Frank D. Cimino (57) ABSTRACT

Systems and methods for selecting Physical Uplink Control Channel (PUCCH) resources are disclosed. An Enhanced Physical Downlink Control Channel (EPDCCH) is detected in signals received from a base station in a first subframe. A HARQ-ACK resource indicator offset ($\Delta ARO$) value is identified for the EPDCCH. A PUCCH resource is selected for transmission of a Hybrid Automatic Repeat reQuest-ACKnowledgement (HARQ-ACK) corresponding to the EPDCCH. The PUCCH resource is selected based upon the $\Delta ARO$ value. The $\Delta ARO$ value may correspond to a semi-statically configured PUCCH resource. A second PUCCH resource may be selected for transmission of the HARQ-ACK on a second antenna port. A HARQ-ACK resource offset field value may be detected in a Downlink Control Information (DCI) format of the EPDCCH. A table that maps the HARQ-ACK resource offset field value for certain DCI formats to $\Delta ARO$ values may be used to determine the $\Delta ARO$ value for the EPDCCH.

18 Claims, 5 Drawing Sheets

Related U.S. Application Data on Jan. 8, 2013, provisional application No. 61/755,675, filed on Jan. 23, 2013, provisional application No. 61/767,012, filed on Feb. 20, 2013.

(58) Field of Classification Search
USPC .......................................................... 370/329
See application file for complete search history.

(56) References Cited

U.S. PATENT DOCUMENTS

| | | | |
|---|---|---|---|
| 2011/0122825 A1* | 5/2011 | Lee | H04J 11/0069 370/328 |
| 2011/0170499 A1 | 7/2011 | Nayeb Nazar et al. | |
| 2012/0039285 A1* | 2/2012 | Seo | H04L 1/1671 370/329 |
| 2012/0207107 A1* | 8/2012 | Li | H04W 52/58 370/329 |
| 2013/0230030 A1* | 9/2013 | Papasakellariou | H04W 72/0413 370/336 |
| 2013/0322352 A1* | 12/2013 | Han | H04W 72/0413 370/329 |
| 2014/0204897 A1* | 7/2014 | Takeda | H04W 72/042 370/329 |
| 2015/0110034 A1* | 4/2015 | Yang | H04L 5/0055 370/329 |
| 2015/0195822 A1* | 7/2015 | Han | H04W 24/08 370/329 |
| 2015/0280883 A1* | 10/2015 | Seo | H04W 72/0413 370/329 |
| 2015/0304994 A1* | 10/2015 | Kim | H04W 72/042 370/280 |

OTHER PUBLICATIONS

CN 201380055693.8 Application, Texas Instruments Incorporated, filed Nov. 4, 2013.

* cited by examiner

EFFICIENT ALLOCATION OF UPLINK HARQ-ACK RESOURCES FOR LTE ENHANCED CONTROL CHANNEL

CROSS-REFERENCE TO RELATED APPLICATIONS

The present application claims the benefit of the filing date of U.S. provisional patent application No. 61/721,880, filed Nov. 2, 2012; U.S. provisional patent application No. 61/750,157, filed Jan. 8, 2013; U.S. provisional patent application No. 61/755,675, filed Jan. 23, 2013; and U.S. provisional patent application No. 61/767,012, filed Feb. 20, 2013, the disclosures of which are hereby incorporated herein by reference in their entireties.

BACKGROUND

Long-Term Evolution (LTE) systems are evolving from homogenous networks of macro base stations that provide basic coverage to multi-layered, heterogeneous networks in which a macro base station may be overlaid and complemented by low-power nodes, such as micro, pico, and femto base stations and relay nodes. It has been observed that some of the original signaling design principles used in LTE Release 8 are no longer optimal when employed in these heterogeneous networks. Enhancements in LTE Release 10 and Release 11, such as improved Downlink (DL) and Uplink (UL) Multi-User Multiple-Input/Multiple-Output (MU-MIMO), DL and UL Coordinated Multipoint Transmission (CoMP)—either with unique physical cell IDs or a shared physical cell ID scenario—and new carrier types for Carrier Aggregation (CA), put a heavy burden on legacy DL control channel capacity. Furthermore, the interference from a macro base station as experienced by User Equipment (UE) within the cell range expansion region of a low power node may prevent successful decoding of DL control signals. Therefore, an Enhanced Physical Downlink Control Channel (EPDCCH) is included for LTE Release 11, where some of the objectives of the EPDCCH include increased control channel capacity, the ability to support frequency domain inter-cell interference control, improved spatial reuse of control channel resources and support of beamforming on the control channel.

SUMMARY OF THE INVENTION

Embodiments of the invention provide systems and methods for selecting Physical Uplink Control Channel (PUCCH) resources. An Enhanced Physical Downlink Control Channel (EPDCCH) is detected in signals received from a base station in a first subframe. A HARQ-ACK resource indicator offset ($\Delta$ARO) value is identified for the EPDCCH. A PUCCH resource is selected for transmission of a Hybrid Automatic Repeat reQuest-ACKnowledgement (HARQ-ACK) corresponding to the EPDCCH. The PUCCH resource is selected based upon the $\Delta$ARO value. A second PUCCH resource may be selected for transmission of the HARQ-ACK on a second antenna port. The $\Delta$ARO field in the EPDCCH may alternatively indicate one out of a set of semi-statically configured PUCCH resources.

A HARQ-ACK resource offset field value may be detected in a Downlink Control Information (DCI) format of the EPDCCH. The $\Delta$ARO value for the EPDCCH can be identified by looking up the HARQ-ACK resource offset field value in a table that maps the HARQ-ACK resource offset field value for certain DCI formats to $\Delta$ARO values.

The HARQ-ACK resource offset field value may be a two-bit field in a DCI payload. For example, the two-bit field may correspond to $\Delta$ARO values in the range $\{0, -1, -2, 2\}$. The HARQ-ACK resource offset field in the DCI format of the EPDCCH may be used to indicate a small offset or a large offset.

In one embodiment, a user equipment device comprises a receiver processor circuit that is configured to detect an Enhanced Physical Downlink Control Channel (EPDCCH) in signals received from a base station in a subframe n. The user equipment device further comprises a transmit processor circuit configured to select a Physical Uplink Control Channel (PUCCH) resource for transmission of a Hybrid Automatic Repeat reQuest-ACKnowledgement (HARQ-ACK) to the base station in a subframe n+k, where k≥4 and the PUCCH resource is selected based upon a HARQ-ACK resource offset. The user equipment device further comprises a modem configured to transmit the PUCCH resource to the base station. The transmit processor circuit may be further configured to select a second PUCCH resource for transmission of the HARQ-ACK on a second antenna port.

BRIEF DESCRIPTION OF THE DRAWINGS

Having thus described the invention in general terms, reference will now be made to the accompanying drawings, wherein:

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

An Enhanced Physical Downlink Control Channel (EPDCCH) is introduced in LTE Release 11. Hybrid Automatic Repeat reQuest-ACKnowledgement (HARQ-ACK) resources on a Physical Uplink Control Channel (PUCCH) need to be determined in response to a Physical Downlink Shared Channel (PDSCH) transmission that is scheduled by either the Physical Downlink Control Channel (PDCCH) or the EPDCCH.

For PDCCH, the dynamic PUCCH resource is given by the expression:

$$n_{PUCCH}^{(1)} = n_{CCE} + N_{PUCCH}^{(1)} \qquad \text{Eq. (1)}$$

wherein $N_{PUCCH}^{(1)}$ is a dynamic PUCCH offset parameter that delineates a dynamic PUCCH region from a semi-static PUCCH region and is either common for the entire cell (cell-specific) or dedicated to a particular UE (UE-specific). The parameter $n_{CCE}$ denotes the first, or lowest-indexed, control channel element used for the PDCCH that schedules a corresponding Downlink Shared Channel (DL-SCH) data transmission on the PDSCH.

For EPDCCH, it has been agreed that the EPDCCH region is configured in a dedicated manner for a UE. A UE can be configured with up to two EPDCCH sets to form a UE-specific search space for receiving downlink control information. Each set may contain {2, 4, 8} Physical Resource Block (PRB) pairs and each set consists of a number of enhanced Control Channel Elements (ECCEs). The ECCEs are indexed per EPDCCH set. One or more ECCEs are aggregated for transmitting a Downlink Control Information (DCI) message on the EPDCCH. Based on this EPDCCH definition, the dynamic PUCCH resource allocation is defined per EPDCCH set and is modified from equation (1) to $$n_{PUCCH}^{(1)} = f(n_{eCCE}) + N_{PUCCH\text{-}UE,k}^{(1)} + \Delta_{ARO} \qquad (2)$$

The $f(n_{eCCE})$ term is a function of the lowest-indexed ECCE in EPDCCH set k that is used to construct the transmitted EPDCCH.

The $N_{PUCCH\text{-}UE,k}^{(1)}$ term is a semi-statically configured dedicated PUCCH resource starting offset for EPDCCH set k.

$\Delta_{ARO}$ is a dynamically signaled HARQ-ACK resource indicator offset that can be used to resolve collisions between PUCCH resources from PDCCH and an EPDCCH set. It can also be used to resolve collisions between PUCCH resources associated with two EPDCCH sets.

The PUCCH regions corresponding to PDCCH and EPDCCH DL assignments can be mapped to non-overlapping PUCCH regions. This partitioning avoids possible collisions between PUCCH resources derived from PDCCH and EPDCCH DL assignments. On the other hand, creating non-overlapping regions is not an efficient use of UL resources because it limits the uplink frequency resources that are available for Uplink Shared Channel (UL-SCH) data transmission on the Physical Uplink Shared Channel (PUSCH).

Therefore, it is more efficient to allow some degree of overlap between PUCCH regions derived from PDCCH and EPDCCH and use the dynamically signaled HARQ-ACK resource indicator offset ($\Delta_{ARO}$) to resolve potential PUCCH resource collisions. A 2-bit ARO field is defined with values $[-\delta, 0, \delta, 2\delta]$, where $\delta$ is the unit offset value. In one embodiment of the present invention the ARO described herein is conveyed in a new field in a DCI format scheduling a DL assignment on the PDSCH. If a UE receives a value of '0' it indicates that no offset is applied in determining the PUCCH resource of equation (2). Therefore, an LTE Evolved Node B (eNB) has three possible offsets that it can use to avoid collision between PUCCH resources when the PUCCH regions are overlapped between PDCCH and EPDCCH sets. Furthermore, using a unit offset of $\delta=2$ ensures that two consecutive resources can be reserved in the case of PUCCH transmit diversity.

Figure 1:
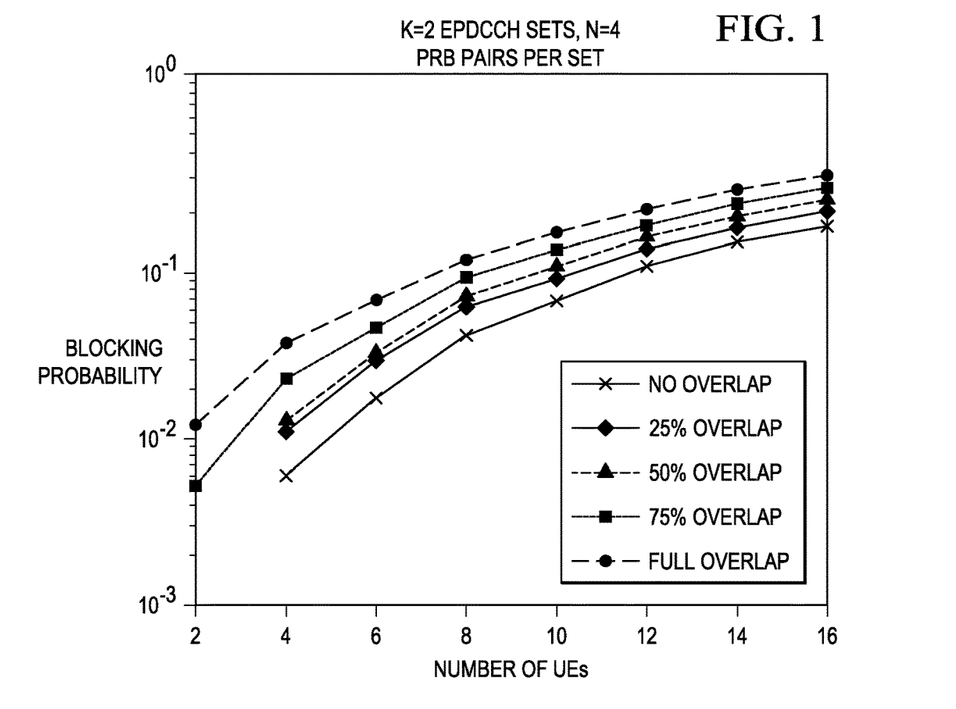
FIG. 1 illustrates the EPDCCH blocking probability taking into account PUCCH resource blocking between two EPDCCH sets for the case where there is no ARO.
Figure 2:
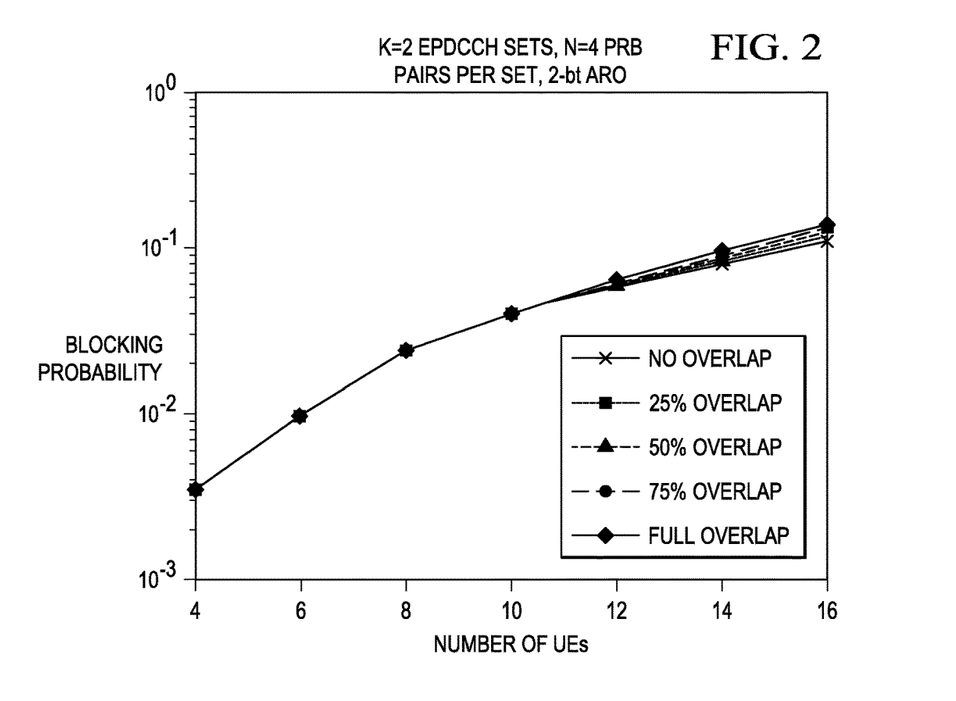
FIG. 2 illustrates EPDCCH blocking probability for the case where ARO is present with $\delta=1$.

To demonstrate the need for an ARO, FIG. 1 illustrates the EPDCCH blocking probability taking into account PUCCH resource blocking between two EPDCCH sets for the case where there is no ARO. The different curves in FIG. 1 show different levels of overlap in the PUCCH regions associated with the two EPDCCH sets. FIG. 2 illustrates EPDCCH blocking probability for the case where ARO is present with $\delta=1$. Comparing FIGS. 1 and 2, it can be seen that for a 10% blocking probability, eight UEs (or rather eight DCI allocations) can be scheduled without ARO whereas at least twelve UEs can be scheduled with ARO. This provides a 50% increase in control channel capacity on the EPDCCH.

Although the ARO reduces the overall blocking probability, the ARO also introduces some limitations. For example, if a UE is configured to receive PDSCH on a secondary serving cell (SCell) in carrier aggregation, the UE is also configured to transmit HARQ-ACK feedback using either PUCCH format 1b with channel selection or PUCCH format 3. For either PUCCH format, the PUCCH resource(s) corresponding to a detected data transmission on the PDSCH on a SCell is indicated by a HARQ-ACK Resource Indicator (ARI) value that is conveyed in the Transmit Power Control (TPC) field of the DCI that schedules the PDSCH. Hence, if EPDCCH schedules PDSCH on a SCell, there is no need for a separate ARO field in the DCI format. Accordingly, embodiments of the present invention include the following options for the ARO field, namely: (1) the ARO field is not configured in the DCI format, (2) the ARO field is configured in the DCI format with redundant information, or (3) designating the ARO field as reserved when the DCI is transmitted on an EPDCCH scheduling PDSCH on a SCell.

Explicit ARO Field for all DCI Formats.

In one embodiment of the present invention, an explicit ARO field is introduced for all DCI formats that are transmitted on the EPDCCH—except for DCI format 4, which is used to schedule UL MIMO transmission.

If a UE receives a PDSCH transmission indicated by detection of a DL assignment on the EPDCCH or an EPDCCH indicating downlink Semi Persistent Scheduling (SPS) release on the primary cell, the UE decodes the EPDCCH with an explicit 2-bit ARO field in the DCI payload.

The ARO field value indicates a resource offset ($\Delta_{ARO}$) in the range $\{-2, 0, 2, 4\}$. In other embodiments of the present invention, the range may be $\{-1, 0, 1, 3\}$ or $\{-2, -1, 0, 2\}$, the main idea taught here is that small offset values are defined to resolve PUCCH resource collisions. Tables 1 and 2 illustrate alternative $\Delta_{ARO}$ mappings for values in the ARO field in DCI format.

TABLE 1

| ARO Field Value | $\Delta_{ARO}$ |
|---|---|
| 0 | 0 |
| 1 | 2 |
| 2 | −1 |
| 3 | −2 |

TABLE 2

| ARO Field Value | $\Delta_{ARO}$ |
| --- | --- |
| 0 | 0 |
| 1 | -1 |
| 2 | -2 |
| 3 | 2 |

Alternatively, the resource offset range may be configured based on whether the UE is configured for transmit diversity on PUCCH format 1a/1b. When a UE is configured to transmit PUCCH format 1a/1b on two antenna ports, the ARO field indicates an offset in the range {-2, 0, 2, 4}. When a UE is configured to transmit PUCCH format 1a/1b on one antenna port, the ARO field indicates an offset in the range {-1, 0, 1, 2} or in the range {0, 1, 2, 3}.

The ARO field may be reserved under the following conditions:

a Time-Division Duplex (TDD) UE that is configured for PUCCH format 3 and an EPDCCH is detected with the value of the downlink assignment index (DAI) greater than 1 in the DCI message; or both FDD and TDD carrier aggregation, if an EPDCCH is detected scheduling PDSCH on a configured SCell and the UE is configured for either PUCCH format 3 or for PUCCH format 1b with channel selection.

Semi-Statically Configured Resources.

In another embodiment, when a UE is configured for PUCCH format 3 or when a UE configured for carrier aggregation using PUCCH format 1b with channel selection, an explicit ARO field may be used to indicate a semi-statically configured resource, such as one out of a set of four semi-statically configured resources.

In LTE Release 10, the TPC field of the DCI format may be re-interpreted as the ARI value when a UE detects a PDCCH scheduling PDSCH on a SCell. Additionally, when a TDD UE that is configured for single cell operation is configured for PUCCH format 3, the TPC field of the DCI format scheduling PDSCH may be used to indicate the ARI if the Downlink Assignment Index (DAI) value is greater than 1. This embodiment restores the TPC field to its original function of providing TPC commands instead of indicating an ARI value.

Therefore, when the DAI value is greater than 1 for an EPDCCH scheduling PDSCH on the primary cell or an EPDCCH indicating SPS release on the primary cell, the TPC field indicates transmit power control commands and the HARQ-ACK resource offset (ARO) field indicates one out of a set of up to four semi-statically configured PUCCH format 3 resources.

For EPDCCH transmitted on the primary cell and scheduling PDSCH on a secondary cell, the TPC field of the EPDCCH may indicate one out of a set of up to four semi-statically configured PUCCH format 3 resources. The ARO field of the EPDCCH may be set to zero or may be reserved (i.e., the value is undefined).

In one alternative, both the TPC field and the ARO field of the EPDCCH may indicate the same PUCCH format 3 resource out of the set of up to four semi-statically configured PUCCH format 3 resources. In another alternative, the TPC field may indicate the TPC command, while the ARO field indicates one PUCCH format 3 resource out of the set of up to four semi-statically configured PUCCH format 3 resources. If a UE detects in the same subframe an EPDCCH on the primary cell scheduling PDSCH on the primary cell and another EPDCCH on the primary cell scheduling PDSCH on a secondary cell, the same TPC value is transmitted on both EPDCCHs.

In a further alternative, the TPC field and ARO field may both indicate the same ARI value for selecting a PUCCH format 3 resource.

Primary Cell Only.

In a further embodiment, an explicit ARO field is inserted only in DCI formats carried in EPDCCH on the primary cell. The UE decodes the EPDCCH on the primary cell assuming the presence of the ARO field. For EPDCCH on a secondary cell, there is no explicit ARO field.

PUCCH Resource Allocation for TDD.

TDD dynamic PUCCH resource allocation corresponding to a detected EPDCCH is similar to FDD with one important exception. For TDD, the UE may need to send HARQ-ACK feedback in an UL subframe corresponding to PDSCH received in multiple DL subframes. In addition to the semi-static resource offset for the EPDCCH set k, PUCCH resources must be reserved for each DL subframe of a length-M HARQ-ACK bundling window. The HARQ-ACK bundling window is also known as the DL association set. The length M of the DL association set depends on the TDD UL/DL configuration and the UL subframe.

The PUCCH resource regions for EPDCCH scheduling are sequentially allocated for each subframe of the HARQ-ACK DL association set of length M. In particular, for the $i^{th}$ DL subframe, the PUCCH region is offset by the total number of ECCEs in all preceding subframes $0, \ldots, i-1$. If there are $N_{eCCE,q,m}$ ECCEs in EPDCCH set q for the subframe $n-k_m$, an equal number of $N_{eCCE,q,m}$ PUCCH resources are reserved in UL subframe n for PDSCH transmitted in subframe $n-k_m$.

The dynamic PUCCH resource allocation corresponding to subframe $n-k_m$ for antenna port p0 is given by:

$$n_{PUCCH,m}^{(1,p_0)} = f(n_{eCCE,q,m}) + \qquad \text{Eq. (3)}$$

$$N_{PUCCH-UE,q}^{(1)} + \sum_{i=0}^{m-1} N_{eCCE,q,i} + \Delta_{ARO} \, 0 \leq m \leq M-1$$

wherein, $$f(n_{eCCE,q,m}) = \begin{cases} \lfloor n_{eCCE,q,m} / N_{eCCE,q}^{RB} \rfloor * N_{eCCE,q}^{RB} + k_{p0} & \text{localized } EPDCCH \\ n_{eCCE,q,m} & \text{distributed } EPDCCH, \end{cases}$$

and $N_{eCCE,q}^{RB}$ is the number of ECCEs in a resource block for EPDCCH set q.

From equation (3) it can be observed that the PUCCH overhead for EPDCCH-based dynamic PUCCH resource allocation can be considerable. As such, it is desirable to design methods to compress PUCCH resource allocation to improve PUSCH transmission capacity. The HARQ-ACK resource offset indicator in this case can therefore be used for two purposes:

(1) used to avoid PUCCH resource collisions between EPDCCH sets and/or between EPDCCH and PDCCH (similar to FDD); and (2) used for PUCCH resource compression between the PUCCH regions that are reserved for each DL subframe in a HARQ-ACK bundling window.

Incorporating some resource compression reduces the degrees of freedom available for resource collision compared to FDD. For a fully loaded system where a significant number of UEs are scheduled in every subframe, resource compression may not be necessary since each PUCCH region per DL subframe is required for PUCCH transmission. For such a scenario, it is desirable to specify the same collision avoidance capability for TDD and FDD.

PUCCH Resource Compression and Collision Avoidance Methods.

3-Bit ARO Field.

In one embodiment, the ARO field size may be set to 3 bits in order to support both collision avoidance and PUCCH resource compression. Table 3 illustrates an exemplary mapping of the ARO field value in the DCI format to the PUCCH resource in Equation 3 above.

TABLE 3

| ARO Value in DCI Format | $\Delta_{ARO}$ (Option 1) | $\Delta_{ARO}$ (Option 2) |
|---|---|---|
| 0 | 0 | 0 |
| 1 | 2 | 2 |
| 2 | −1 | −1 |
| 3 | −2 | −2 |
| 4 | $-N_{eCCE,q,\,i-1}$ | $-N_{eCCE,\,q,\,i-1}$ |
| 5 | $-N_{eCCE,\,q,\,i-1} + 2$ | $-(N_{eCCE,\,q,\,i-1} + N_{eCCE,\,q,\,i-2})$ |
| 6 | $-N_{eCCE,\,q,\,i-1} - 1$ | $-(N_{eCCE,\,q,\,i-1} + N_{eCCE,\,q,\,i-2} + N_{eCCE,\,i-3,j})$ |
| 7 | $-N_{eCCE,\,q,\,i-1} - 2$ | Reserved |

For Option 1 in Table 3, the last four entries offset the PUCCH resource for the $i^{th}$ DL subframe by the number of ECCEs in subframe i−1 of EPDCCH set q. These entries retain resource collision avoidance capability as in FDD by further offsetting by the values {−2, 0, 1, 2}. This approach allows a resource compression on the order of one DL subframe. For example, for TDD UL/DL configuration 2 where the length of the DL association set M=4 in both UL subframes n=2 and n=7, it is possible to save the implicit resource allocation for the fourth DL subframe of the DL association set. A different mapping of ARO values, consisting of a mix of resource compression and collision avoidance, may also be used in other embodiments.

For Option 2 in Table 3, the last four entries offset the resource allocation by the number of ECCEs allocated to set q in one or more previous DL subframes.

Trade-Off PUCCH Resource Collision Avoidance and Resource Compression.

TDD PUCCH resource compression reduces the resource collision avoidance capability if the ARO field size is unchanged with respect to FDD. If this is deemed acceptable in order to keep the same ARO field size in DCI formats for both duplex modes, the following set of values may be used in various options.

Option 1

For the $i^{th}$ subframe of the DL association set, the set of ARO values is given as $$\Delta_{ARO} \in \{0, 2, -N_{ECCE,q,i-1}-1, -N_{ECCE,q,i-1}-2\} i>0.$$

For subframe i=0, this set reverts back to the same one for FDD, i.e. {0, 2, −1, −2}, whereas for i>1, resource compression of one DL subframe is possible.

Option 2

For the $i^{th}$ subframe of the HARQ-ACK bundling window, the set of ARO values is given as $$\Delta_{ARO} \in \{0, 2, -N_{ECCE,i-1,j}+1, -N_{ECCE,i-1,j}+2\} i>0.$$

For subframe i=0, this set reverts back to the same one for FDD, i.e. {0, 2, −1, −2}, whereas for i>1, resource compression of one DL subframe is possible.

Options 1 and 2 are similar with a slight change in the last two offset values.

Option 3

Alternatively, the ARO set may be defined as $$\Delta_{ARO} \in \{0,2,-1,-N_{ECCE,q,0}\} i=1$$

$$\Delta_{ARO} \in \{0,2,-N_{ECCE,q,0},-(N_{ECC,q,0}+N_{ECCE,q,1})\} i=2$$

$$\Delta_{ARO} \in \{0,-N_{ECC,q,0},-(N_{ECC,q,0}+N_{ECCE,q,1}),-(N_{ECC,q,0}+N_{ECCE,q,1}+N_{ECCE,q,2})\} i>2$$

Other alternative options are not precluded as the main idea taught by the present invention is that both small offsets and large offsets can be designed for the ARO field. The small offsets are used to resolve PUCCH resource collisions between assignments in two EPDCCH sets or between an EPDCCH set and PDCCH-based resource allocation. The large offset on the other hand, is used to compress PUCCH resource by moving from one reserved block to another.

Figure 3:
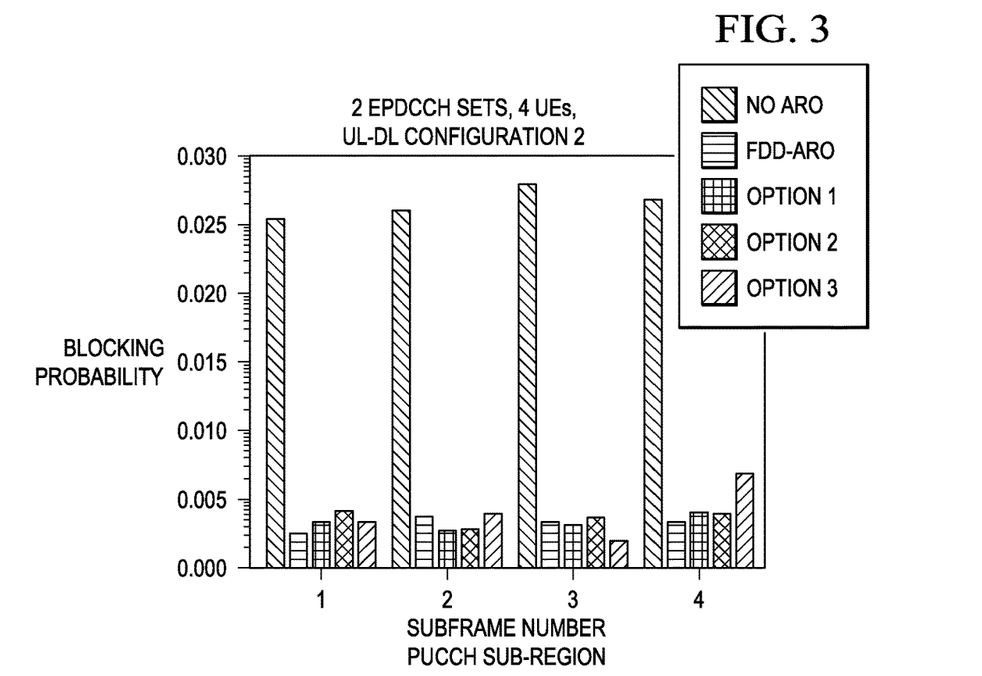
FIG. 3 is a chart illustrating a comparison of the blocking probability in a lightly loaded system consisting of four UEs.

FIG. 3 is a chart illustrating a comparison of the blocking probability given two EPDCCH sets, TDD UL/DL Configuration #2 and a lightly loaded system consisting of four UEs.

Figure 4:
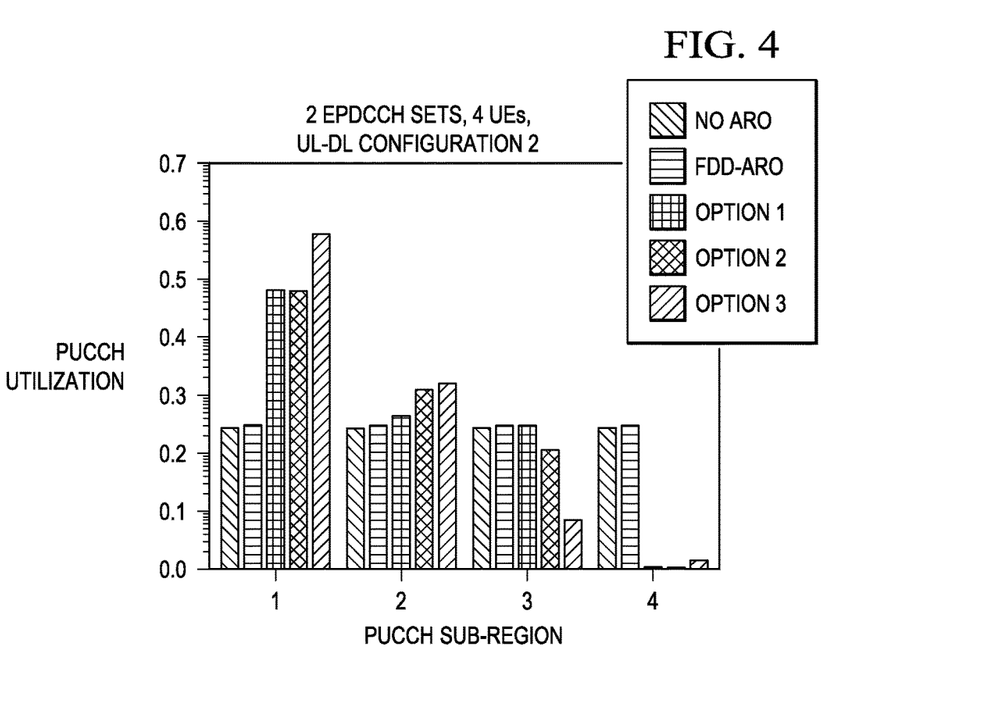
FIG. 4 is a chart illustrating a comparison of the PUCCH utilization for the lightly loaded system shown in FIG. 3.

FIG. 4 is a chart illustrating a comparison of the PUCCH utilization for the lightly loaded system shown in FIG. 3.

Figure 5:
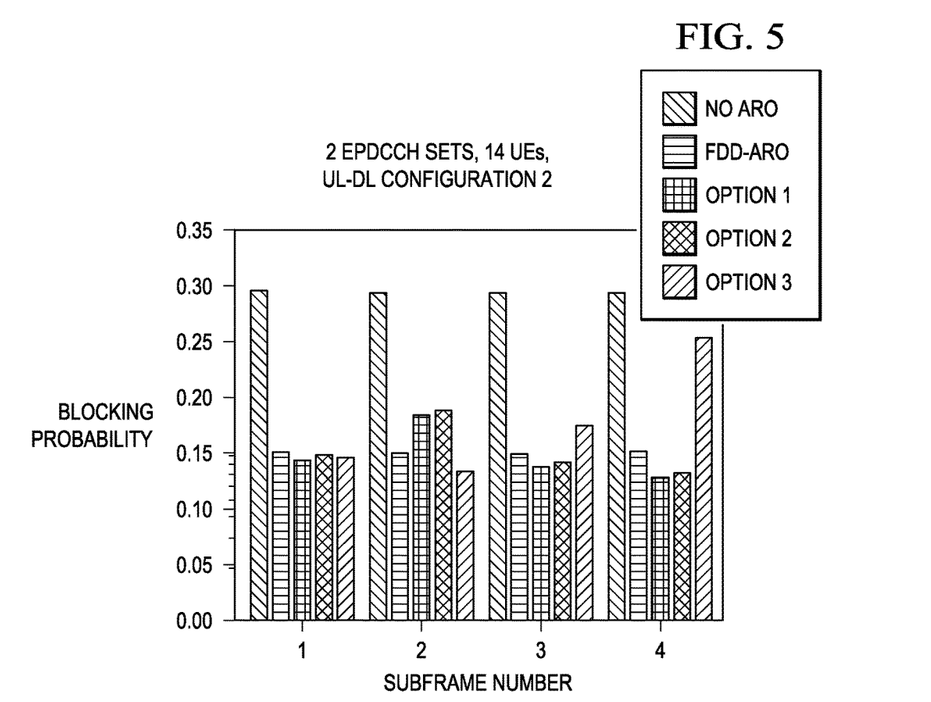
FIG. 5 is a chart illustrating a comparison of the blocking probability in a heavily loaded system consisting of fourteen UEs.

FIG. 5 is a chart illustrating a comparison of the blocking probability given two EPDCCH sets, TDD UL/DL Configuration #2 and a heavily loaded system consisting of fourteen UEs.

Figure 6:
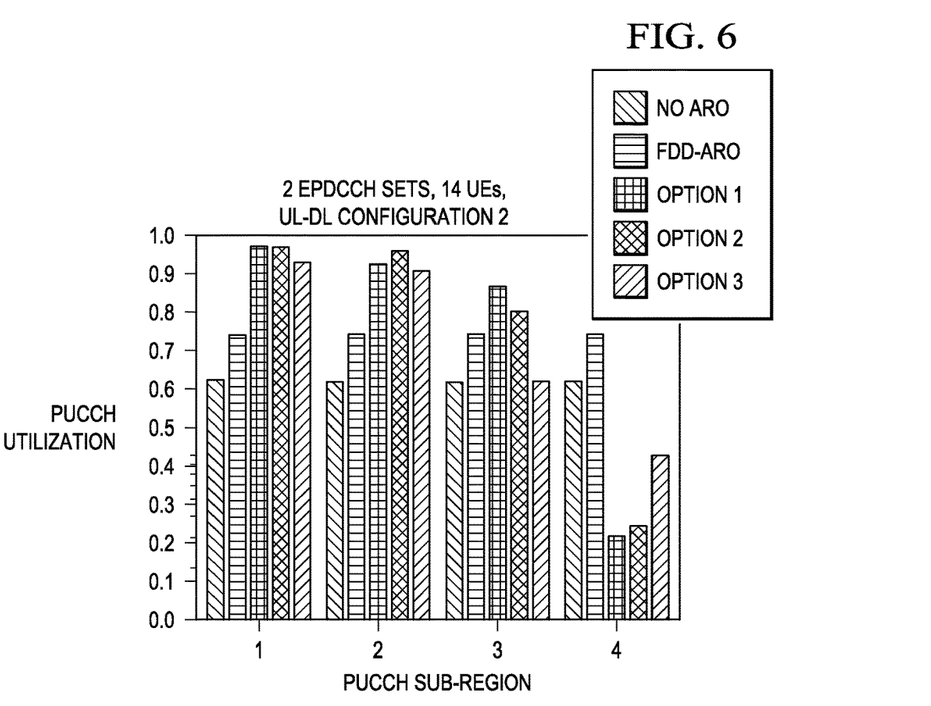
FIG. 6 is a chart illustrating a comparison of the PUCCH utilization for the heavily loaded system shown in FIG. 5.

FIG. 6 is a chart illustrating a comparison of the PUCCH utilization for the heavily loaded system shown in FIG. 5.

FIGS. 3-6 compare options 1, 2, and 3 as described above. As a baseline, the results with no ARO and results using an FDD ARO set of {0, 2, −1, −2} are included in the comparisons.

FIGS. 3 and 5 show the blocking probability for each scheduled DL subframe assuming all UEs are scheduled in each subframe of the bundling window. FIGS. 4 and 6 show the PUCCH utilization for each PUCCH sub-region corresponding to each of the scheduled DL subframes. The comparison results illustrated in FIGS. 3-6 can be summarized as follows.

For a lightly loaded system, all ARO options (including the FDD ARO set) achieve the intended goal of reducing the blocking probability with respect to no ARO indication. Accordingly, one PUCCH sub-region can be saved for all three options for combining resource compression with collision avoidance. In one embodiment, options 1 and 2 achieve the best PUCCH utilization. For sixteen ECCEs in an EPDCCH set, this translates to roughly one PRB (assuming that the eNB allocates eighteen format 1a/1b resources in one PRB).

For a heavily loaded system, although PUCCH utilization approaches 100% in the first sub-region, there is still appreciable PUCCH utilization in the last sub-region (i.e., there is no PUCCH saving compared to using the FDD ARO set). Furthermore, from a system perspective, there may not be significant gain in minimizing PUCCH overhead for a fully loaded system. Although it may be argued that if higher aggregation levels are more likely to be transmitted the PUCCH resource utilization for FDD is low, it is not necessarily desirable to increase packing efficiency per PUCCH PRB because of the resulting higher intra-cell interference (this is also true for PDCCH-based PUCCH resource allocation).

FIG. 5 also indicates that the blocking probability is low for Option 3 because, for each DL subframe, more degrees of freedom are used for resource compression to the detriment of collision avoidance. In contrast, Options 1 and 2 appear to efficiently utilize the degrees of freedom to provide both resource compression and collision avoidance capabilities.

EPDCCH Monitoring Set for PUCCH Resource Allocation.

An LTE Release 11 UE can be configured to monitor the EPDCCH on a subset of all possible DL and special subframes. When the UE is not configured to monitor EPDCCH in a subframe, it monitors the legacy PDCCH for DL assignments including PDCCH indicating SPS release and UL grants. It may occur that in the same DL association set of length M>1, the UE may be configured to monitor EPDCCH in some subframes and PDCCH in the other subframes. For such scenarios the PUCCH resource allocation needs to be specified.

For a PDSCH transmission indicated by the detection of corresponding EPDCCH or a EPDCCH indicating downlink SPS release in sub-frame $n-k_m$ the PUCCH resource for antenna port p0 is $$n_{PUCCH,m}^{(1,\tilde{p}_0)} = f(n_{eCCE,q,m}) + N_{PUCCH-UE,q}^{(1)} + \sum_{m' \in S^{(m)}} N_{eCCE,q,m'} + \Delta_{ARO} \quad 0 \le m \le M-1$$

wherein $S^{(m)}$ is the subset of DL subframes in the DL association set $\{n-k_0, n-k_1, \ldots, n-k_{m-1}\}$ for which the UE is configured to monitor the EPDCCH.

This TDD resource allocation implies that if a UE is configured to monitor EPDCCH in all MDL subframes of a DL association set, then $$\sum_{m=0}^{M-1} N_{eCCE,q,m}$$

PUCCH resources shall be reserved for set q. The worst case occurs for TDD UL-DL configuration 5 with nine DL subframes and one UL subframe.

Figure 7:
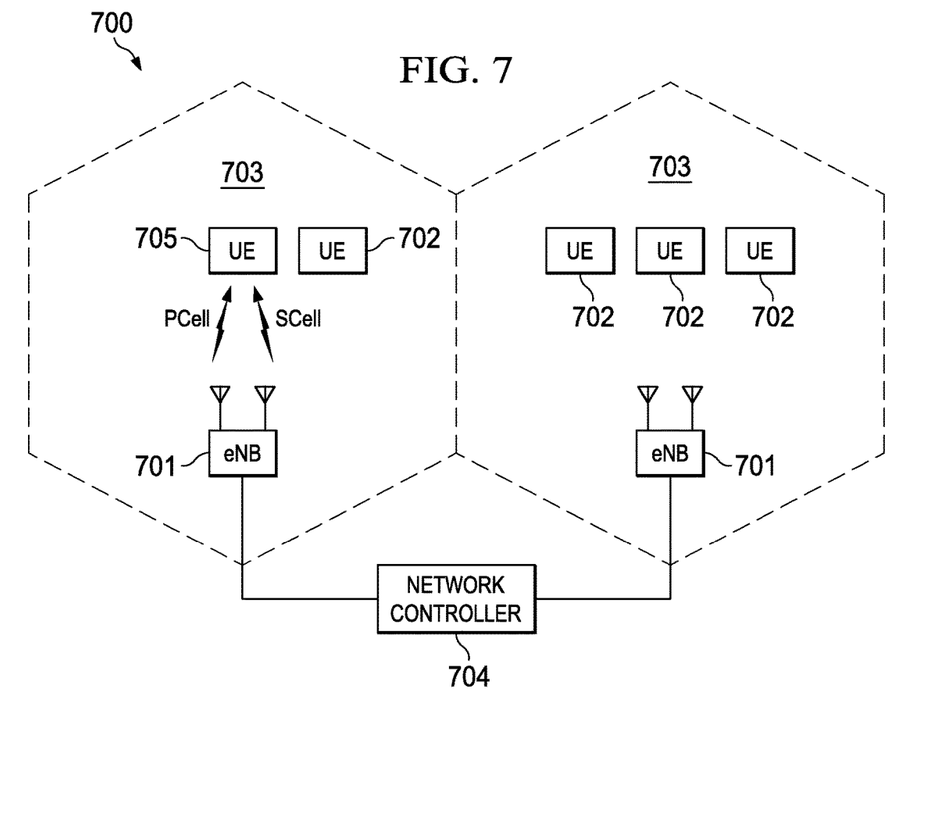
FIG. 7 is a block diagram of a wireless communication network according to one embodiment.

FIG. 7 is a block diagram of a wireless communication network 700, which may be an LTE network that utilizes orthogonal frequency-division multiple access (OFDMA) on the downlink and single-carrier frequency division multiple access (SC-FDMA) on the uplink. LTE partitions system bandwidth into multiple orthogonal subcarriers, which may be referred to as frequency tones or frequency bins. Each subcarrier may be modulated with data, control, or reference signals. The wireless network 700 includes a number of evolved Node Bs (eNBs) 701 and other network entities. The eNBs 701 communicate with user equipment devices (UEs) 702, 705. Each eNB 701 provides communication services for a particular geographic area or "cell" 703. eNB 701 may be a macro base station, micro base station, pico base station, or femto base station, for example. A network controller 704 may be coupled to a set of eNBs 701 and provide coordination and control for these eNBs 701.

UEs 702, 705 may be stationary or mobile and may be located throughout the wireless network 700. UEs 702, 705 may be referred to as a terminal, a mobile station, a subscriber unit, a station, such as a mobile telephone, a personal digital assistant (PDA), a wireless modem, a laptop or notebook computer, a tablet, and the like. A UE 702 communicates with an eNB 701 serving the cell 703 in which the UE 702 is located.

A UE 702 may communicate with more than one eNB 701 if the cells 703 of the eNBs 701 overlap. One eNB 701 will be the primary cell (PCell) and the other eNBs 701 will be secondary serving cells (SCell).

Figure 8:
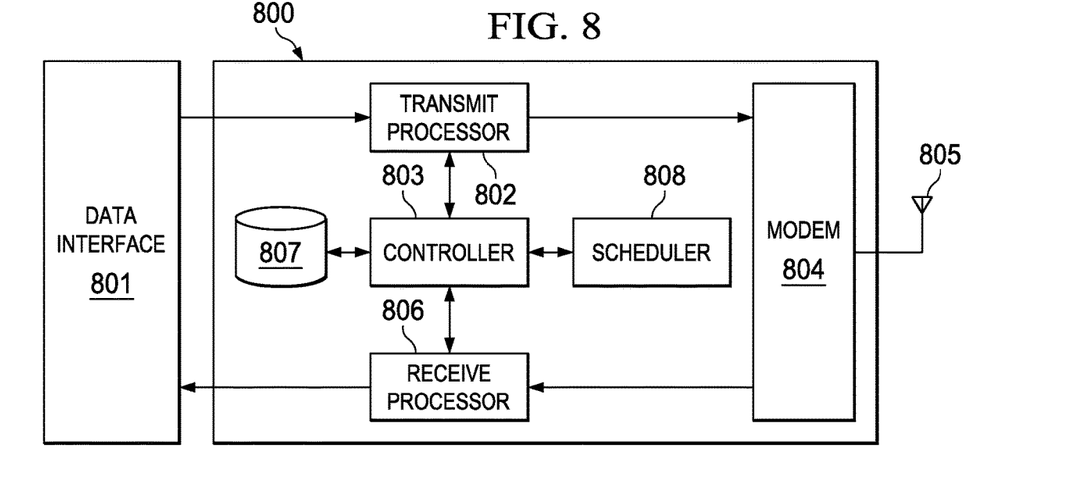
FIG. 8 is a high level block diagram of a system that may be used as an eNB or UE according to one embodiment.

FIG. 8 is a high level block diagram of a system 800 that may be used as an eNB or UE, which may be, for example, eNB 701 or UE 702 in FIG. 7. System 800 receives data to be transmitted from an interface 801 at transmit processor 802. The data may include, for example, audio or video information or other data file information to be transmitted on a PUSCH. The transmit processor 802 may also receive control or HARQ-ACK information to be transmitted on a PUCCH, PUSCH, or SRS, from a controller 803. Transmit processor 802 processes (e.g., encode and symbol map) the data and control information to obtain data symbols, control symbols, and reference symbols. The transmit processor 802 may also perform spatial processing or precoding on the data symbols and/or the control symbols and reference symbols. The output of the transmit processor 802 is provided to a modem 804. Modem 804 processes the output symbol stream from the transmit processor 802 to obtain an output sample stream that is further processed by converting to analog, amplifying, and upconverting before being transmitted via antenna 805. In other embodiments, multiple modems 804 may be used to support multiple-input multiple-output (MIMO) transmission on multiple antennas 805.

Signals are also received at system 800 on antenna 805 from other devices. The received signals are provided to modem 804 for demodulation. Modem 804 processes the signals by filtering, amplifying, downconverting, and/or digitizing, for example, to obtain input samples. Modem 804 or a receive processor 806 may further process the input samples to obtain received symbols. Receive processor 806 then processes the symbols by demodulating, deinterleaving, and/or decoding, for example. Receive processor 805 then provides decoded data to interface 801 for use by the eNB or UE. Receive processor further provides decoded control information to controller 803.

Controller 803 may direct the operation of system 800 in the eNB or UE, such as by adjusting timing and power levels. A memory 807 may store data and program codes for controller 803, transmit processor 802, and/or receive processor 806. Additional components, such as a scheduler 808 may schedule downlink and/or uplink data transmission on one or more component carriers by system 800 (e.g., in an eNB).

Figure 9:
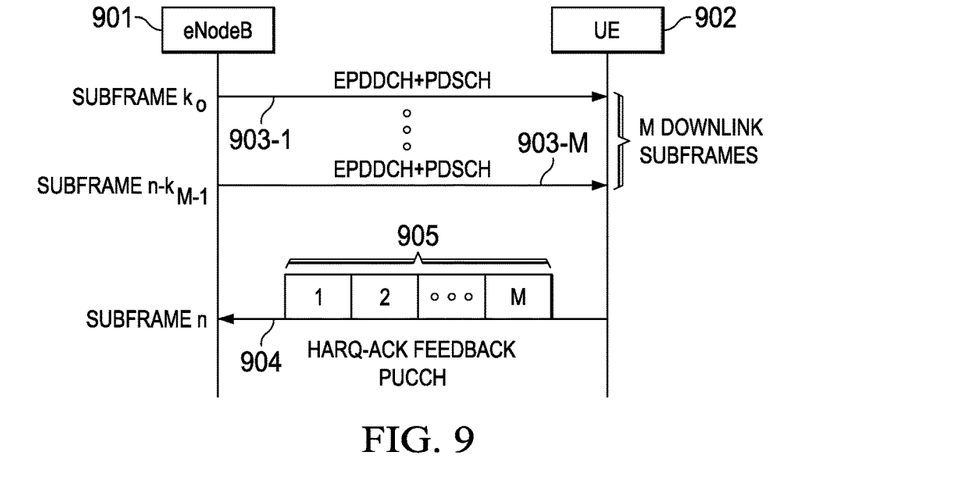
FIG. 9 illustrates EPDCCH-based PUCCH resource allocation according to one embodiment.

FIG. 9 illustrates EPDCCH-based PUCCH resource allocation according to one embodiment. eNodeB 901 transmits on downlink channels to UE 902. For example, eNodeB 901 transmits M EPDDCH and PDSCH to UE 902 on M downlink subframes 903-1 through 903-M starting at subframe $n-k_0$ to subframe $n-k_{M-1}$. In a subsequent uplink subframe n, UE 902 has to feedback HARQ-ACK 904 to eNodeB 901 for the M downlink subframes 903.

eNodeB 901 reserves PUCCH resources 905 for M subframes. For FDD, M=1 and $k_0$=4. For TDD, M>1 and $k_m$≥4 and takes values depending on the UL subframe and the TDD UL/DL configuration as shown in Table 4. Embodiments of the invention disclosed herein provide a system and method for PUCCH resource compression, which saves PUCCH resources when PDSCH is scheduled by EPDCCH.

Additionally, embodiments avoid PUCCH resource collision between multiple UEs and/or between multiple EPDCCH sets.

$N_{PUCCH,q}^{(e1)}$ for EPDCCH-PRB-set q is configured by a higher layer parameter designated as pucch-ResourceStart-Offset-r11. $N_{RB}^{ECCE,q}$ for EPDCCH-PRB-set q is given in

TABLE 4

| UL/DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

The dynamic HARQ-ACK resource offset ($\Delta_{ARO}$) is used to compress PUCCH resources in an UL subframe 904 as shown in Equation 3 above.

Figure 10:
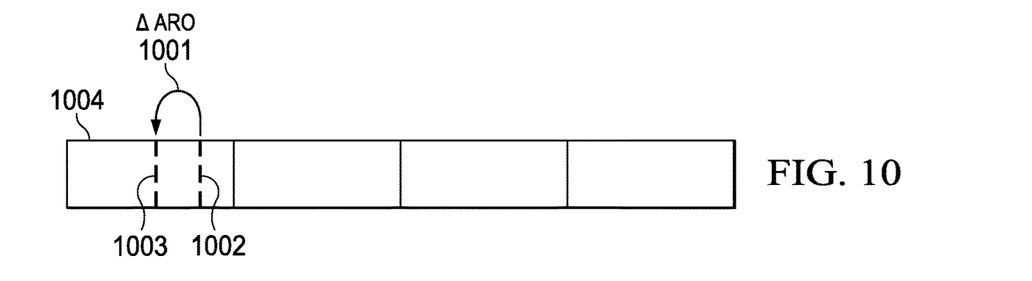
FIG. 10 is a block diagram illustrating the use of a small $\Delta_{ARO}$ value within one PUCCH resource allocation block.

FIG. 10 is a block diagram illustrating the use of a small $\Delta_{ARO}$ value within one PUCCH resource allocation block. For FDD and TDD, using a relatively small value of $\Delta_{ARO}$ 1001, the UE moves from resource 1002 to resource 1003 within PUCCH resource allocation block 1004. This movement within a single PUCCH resource allocation block is used to avoid collision between different UEs.

Figure 11:
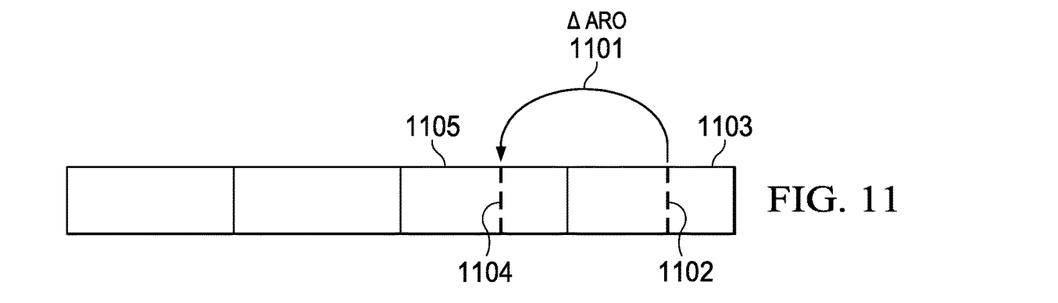
FIG. 11 is a block diagram illustrating the use of a large $\Delta_{ARO}$ value to move from one PUCCH resource allocation block to another.

FIG. 11 is a block diagram illustrating the use of a large $\Delta_{ARO}$ value to move from one PUCCH resource allocation block to another. For TDD with M=4 downlink subframes, using a relatively large value of $\Delta_{ARO}$ 1101, a UE is moved from 1102 in PUCCH resource allocation block 1103 to 1104 within PUCCH resource allocation block 1105. This movement saves PUCCH resource allocation block 1103.

Figure 12:
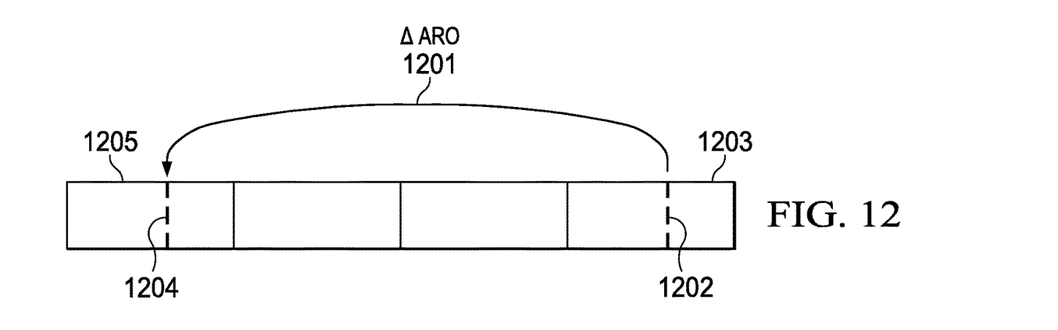
FIG. 12 block diagram illustrating a modification wherein UE resource allocations are moved beyond adjacent blocks.

FIG. 12 is a block diagram illustrating a modification of the embodiment shown in FIG. 11 wherein UE resource allocations are moved beyond adjacent blocks. In FIG. 12 $\Delta_{ARO}$ 1201 moves the UE resource allocation from 1202 in block 1203 to resource 1204 in block 1205.

FDD HARQ-ACK Procedure for One Configured Serving Cell

For a PDSCH transmission indicated by the detection of a corresponding EPDCCH in subframe n−4, or for an EPDCCH indicating downlink SPS release in subframe n−4, the UE shall use:

$$n_{PUCCH}^{(1,\tilde{p}0)} = n_{ECCR,q} \Delta_{ARO} + N_{PUCCH,q}^{(e1)}$$

if EPDCCH-PRB-set is configured for distributed transmission; or $$n_{PUCCH}^{(1,\tilde{p}0)} = \left\lfloor \frac{n_{ECCE,q}}{N_{RB}^{ECCE,q}} \right\rfloor \cdot N_{RB}^{ECCE,q} + n' + \Delta_{ARO} + N_{PUCCH,q}^{(e1)}$$

if EPDCCH-PRB-set is configured for localized transmission,

These values are for antenna port $p_0$. where $n_{ECCE,q}$ is the number of the first ECCE (i.e., lowest ECCE index used to construct the EPDCCH) used for transmission of the corresponding DCI assignment in EPDCCH-PRB-set q. The value of $\Delta_{ARO}$ is determined from the HARQ-ACK resource offset field in the DCI format of the corresponding EPDCCH as given in a Table 5 below, which is a mapping of the ACK/NACK Resource offset field in DCI format 1A/1B/1D/1/2A/2/2B/2C/2D to $\Delta_{ARO}$ values.

section 6.8A.1 of 3GPP TS 36.211: "Evolved Universal Terrestrial Radio Access (E-UTRA); Physical channels and modulation." n' is determined from the antenna port used for localized EPDCCH transmission which is described in section 6.8A.5 in 3GPP TS 36.211.

For two antenna port transmission the PUCCH resource for antenna port $p_1$ is given by $$n_{PUCCH}^{(1,\tilde{p}1)} = n_{ECCE,q} + 1 + \Delta_{ARO} + N_{PUCCH,q}^{(e1)}$$

if EPDCCH-PRB-set is configured for distributed transmission; or $$n_{PUCCH}^{(1,\tilde{p}1)} = \left\lfloor \frac{n_{ECCE,q}}{N_{RB}^{ECCE,q}} \right\rfloor \cdot N_{RB}^{ECCE,q} + 1 + n' + \Delta_{ARO} + N_{PUCCH,q}^{(e1)}$$

if EPDCCH-PRB-set is configured for localised transmission.

TABLE 5

| ACK/NACK Resource Offset Field in DCI Format 1A/1B/1D/1/2A/2/2B/2C/2D | $\Delta_{ARO}$ |
|---|---|
| 0 | 0 |
| 1 | −1 |
| 2 | −2 |
| 3 | 2 |

Many modifications and other embodiments of the invention will come to mind to one skilled in the art to which this invention pertains having the benefit of the teachings presented in the foregoing descriptions, and the associated drawings. Therefore, it is to be understood that the invention is not to be limited to the specific embodiments disclosed. Although specific terms are employed herein, they are used in a generic and descriptive sense only and not for purposes of limitation.

What is claimed is:
1. A method, comprising:
   detecting, with one or more circuits in a User Equipment (UE), an Enhanced Physical Downlink Control Channel (EPDCCH) in a first subframe, the EPDCCH including a Downlink Control Information (DCI) message that includes a Transmit Power Control (TPC) field and a Hybrid Automatic Repeat reQuest-ACKnowledgement (HARQ-ACK) resource offset field, the HARQ-ACK resource offset field being set to zero when the EPDCCH including the DCI message is transmitted on a primary cell and schedules a Physical Downlink Shared Channel (PDSCH) transmission on a secondary cell and the UE is configured with Physical Uplink Control Channel (PUCCH) format 3; and selecting, with the one or more circuits in the UE, a PUCCH resource for transmission of a Hybrid Automatic Repeat reQuest-ACKnowledgement (HARQ-ACK) in a second subframe based on a value of the TPC field and four configured PUCCH resource values.

2. The method of claim 1, further comprising:
selecting a second PUCCH resource for transmission of the HARQ-ACK on a second antenna port.

3. The method of claim 1, further comprising:
detecting a HARQ-ACK resource offset field value in a Downlink Control Information (DCI) format of the EPDCCH; and
determining a $\Delta_{ARO}$ value for the EPDCCH based on the HARQ-ACK resource offset field.

4. The method of claim 3, wherein a table maps the HARQ-ACK resource offset field value for certain DCI formats to $\Delta_{ARO}$ values.

5. The method of claim 3, wherein the HARQ-ACK resource offset field value is a two-bit field in a DCI payload.

6. The method of claim 5, wherein the two-bit field corresponds to $\Delta_{ARO}$ values in the following set: $\{0, -1, -2, 2\}$.

7. The method of claim 3, wherein the HARQ-ACK resource offset field in a DCI format of the EPDCCH is used to indicate a small offset or a large offset.

8. The method of claim 7, wherein:
a two-bit HARQ-ACK resource offset field ($\Delta_{ARO}$) is inserted in an EPDCCH set scheduling downlink assignments on the PDSCH; and
the value of the HARQ-ACK resource offset field for PUCCH resource allocation for subframe n−$k_m$ indicate values in the range $\{0, -1, -N_{ECCE,q,m-1}-1, N_{ECCE,q,m-1}-2\}$.

9. The method of claim 1, wherein the TPC field indicates one out of the four configured PUCCH resource values.

10. A user equipment (UE) comprising one or more processor circuits configured to:
detect an Enhanced Physical Downlink Control Channel (EPDCCH) in a first subframe, the EPDCCH including a Downlink Control Information (DCI) message that includes a Transmit Power Control (TPC) field and a Hybrid Automatic Repeat reQuest-ACKnowledgement (HARQ-ACK) resource offset field, the HARQ-ACK resource offset field being set to zero when the EPDCCH including the DCI message is transmitted on a primary cell and schedules a Physical Downlink Shared Channel (PDSCH) transmission on a secondary cell and the UE is configured with Physical Uplink Control Channel (PUCCH) format 3; and
select a PUCCH resource for transmission of a Hybrid Automatic Repeat reQuest-ACKnowledgement (HARQ-ACK) in a second subframe based on a value of the TPC field and four configured PUCCH resource values.

11. A method, comprising:
detecting, by a User Equipment (UE), an Enhanced Physical Downlink Control Channel (EPDCCH) in a first subframe, the EPDCCH carrying a Downlink Control Information (DCI) format that includes a Transmit Power Control (TPC) field and a Hybrid Automatic Repeat reQuest-ACKnowledgement (HARQ-ACK) resource offset field, the HARQ-ACK resource offset field being set to zero when the DCI format is carried by the EPDCCH on a primary cell scheduling a Physical Downlink Shared Channel (PDSCH) transmission on a secondary cell and the UE is configured with Physical Uplink Control Channel (PUCCH) format 3;
selecting, by the UE, a PUCCH resource for transmission of a HARQ-ACK in a second subframe based on a value of the TPC field and four configured PUCCH resource values; and
transmitting, by the UE, the HARQ-ACK in the selected PUCCH resource of the second subframe.

12. A user equipment (UE) comprising one or more processor circuits configured to:
detect an Enhanced Physical Downlink Control Channel (EPDCCH) in a first subframe, the EPDCCH carrying a Downlink Control Information (DCI) format that includes a Transmit Power Control (TPC) field and a Hybrid Automatic Repeat reQuest-ACKnowledgement (HARQ-ACK) resource offset field, the HARQ-ACK resource offset field being set to zero when the DCI format is carried by the EPDCCH on a primary cell scheduling a Physical Downlink Shared Channel (PDSCH) transmission on a secondary cell and the UE is configured with Physical Uplink Control Channel (PUCCH) format 3; and
select a PUCCH resource for transmission of a HARQ-ACK in a second subframe based on a value of the TPC field and four configured PUCCH resource values.

13. The UE of claim 12, wherein the one or more processor circuits are further configured to:
transmit the HARQ-ACK in the selected PUCCH resource of the second subframe.

14. A user equipment (UE) comprising:
one or more processors configured to:
detect an Enhanced Physical Downlink Control Channel (EPDCCH) in a first subframe, the EPDCCH carrying a Downlink Control Information (DCI) format that includes a Transmit Power Control (TPC) field and a Hybrid Automatic Repeat reQuest-ACKnowledgement (HARQ-ACK) resource offset field, the HARQ-ACK resource offset field being set to zero when the DCI format is carried by the EPDCCH on a primary cell scheduling a Physical Downlink Shared Channel (PDSCH) transmission on a secondary cell and the UE is configured with Physical Uplink Control Channel (PUCCH) format 3; and
select a PUCCH resource for transmission of a HARQ-ACK in a second subframe based on a value of the TPC field and four configured PUCCH resource values; and
a modem configured to transmit the HARQ-ACK in the selected PUCCH resource of the second subframe.

15. A method, comprising:
detecting, by a User Equipment (UE), an Enhanced Physical Downlink Control Channel (EPDCCH) in a first subframe, the EPDCCH carrying Downlink Control Information (DCI) that has a DCI format, the DCI format including a Transmit Power Control (TPC) field and a Hybrid Automatic Repeat reQuest-ACKnowledgement (HARQ-ACK) resource offset field, the HARQ-ACK resource offset field being set to zero when the DCI format is carried by the EPDCCH on a primary cell scheduling a Physical Downlink Shared Channel (PDSCH) transmission on a secondary cell and the UE is configured with Physical Uplink Control Channel (PUCCH) format 3;

selecting, by the UE, a PUCCH resource for transmission of a HARQ-ACK in a second subframe based on a value of the TPC field and four configured PUCCH resource values; and transmitting, by the UE, the HARQ-ACK in the selected PUCCH resource of the second subframe.

16. A user equipment (UE) comprising one or more processor circuits configured to:

detect an Enhanced Physical Downlink Control Channel (EPDCCH) in a first subframe, the EPDCCH carrying Downlink Control Information (DCI) that has a DCI format, the DCI format including a Transmit Power Control (TPC) field and a Hybrid Automatic Repeat reQuest-ACKnowledgement (HARQ-ACK) resource offset field, the HARQ-ACK resource offset field being set to zero when the DCI format is carried by the EPDCCH on a primary cell scheduling a Physical Downlink Shared Channel (PDSCH) transmission on a secondary cell and the UE is configured with Physical Uplink Control Channel (PUCCH) format 3; and select a PUCCH resource for transmission of a HARQ-ACK in a second subframe based on a value of the TPC field and four configured PUCCH resource values.

17. The UE of claim 16, wherein the one or more processor circuits are further configured to:

transmit the HARQ-ACK in the selected PUCCH resource of the second subframe.

18. A user equipment (UE) comprising:

one or more processors configured to:

detect an Enhanced Physical Downlink Control Channel (EPDCCH) in a first subframe, the EPDCCH carrying Downlink Control Information (DCI) that has a DCI format, the DCI format including a Transmit Power Control (TPC) field and a Hybrid Automatic Repeat reQuest-ACKnowledgement (HARQ-ACK) resource offset field, the HARQ-ACK resource offset field being set to zero when the DCI format is carried by the EPDCCH on a primary cell scheduling a Physical Downlink Shared Channel (PDSCH) transmission on a secondary cell and the UE is configured with Physical Uplink Control Channel (PUCCH) format 3; and select a PUCCH resource for transmission of a HARQ-ACK in a second subframe based on a value of the TPC field and four configured PUCCH resource values; and a modem configured to transmit the HARQ-ACK in the selected PUCCH resource of the second subframe.

* * * * *